US011937648B2

(12) United States Patent
Grandjean et al.

(10) Patent No.: US 11,937,648 B2
(45) Date of Patent: Mar. 26, 2024

(54) AEROSOL GENERATING SYSTEM WITH SUBSTRATE ADVANCE

(71) Applicant: PHILIP MORRIS PRODUCTS S.A., Neuchatel (CH)

(72) Inventors: Emeric Grandjean, Lausanne (CH); Irene Taurino, Lausanne (CH); Igor Nikolaevich Zinovik, Peseaux (CH)

(73) Assignee: Philip Morris Products S.A., Neuchatel (CH)

( * ) Notice: Subject to any disclaimer, the term of this patent is extended or adjusted under 35 U.S.C. 154(b) by 488 days.

(21) Appl. No.: 17/276,613

(22) PCT Filed: Sep. 26, 2019

(86) PCT No.: PCT/EP2019/076068
§ 371 (c)(1),
(2) Date: Mar. 16, 2021

(87) PCT Pub. No.: WO2020/064944
PCT Pub. Date: Apr. 2, 2020

(65) Prior Publication Data

US 2021/0360978 A1 Nov. 25, 2021

(30) Foreign Application Priority Data

Sep. 28, 2018 (EP) .................................... 18197775

(51) Int. Cl.
*A24F 40/53* (2020.01)
*A24F 40/20* (2020.01)
(Continued)

(52) U.S. Cl.
CPC .............. *A24F 40/53* (2020.01); *A24F 40/20* (2020.01); *A24F 40/42* (2020.01); *A24F 40/46* (2020.01); *A24F 40/60* (2020.01); *H05B 3/24* (2013.01)

(58) Field of Classification Search
CPC .......... A24F 40/53; A24F 40/20; A24F 40/42; A24F 40/46; A24F 40/60; A24F 40/40; A24F 40/50; H05B 3/24
See application file for complete search history.

(56) References Cited

U.S. PATENT DOCUMENTS 6,234,167 B1 * 5/2001 Cox ........................ A24F 40/50 128/200.14
9,532,603 B2 1/2017 Plojoux
(Continued)

FOREIGN PATENT DOCUMENTS

EP 2468117 6/2012
EP 2609820 7/2013
(Continued)

OTHER PUBLICATIONS

Extended European Search Report for Application No. 22193235.3 dated Dec. 14, 2022 (10 pages).
(Continued)

*Primary Examiner* — Edwin A. Leon
(74) *Attorney, Agent, or Firm* — Mueting Raasch Group

(57) ABSTRACT

An aerosol generating system includes, a body defining a cavity having a cavity opening, an aerosol-forming substrate disposed in the cavity, a heating element disposed proximate to the cavity opening, and a controller configured to detect contact of the aerosol-forming substrate with the heating element.

14 Claims, 3 Drawing Sheets

(51) Int. Cl.

| | |
|---|---|
| ***A24F 40/42*** | (2020.01) |
| ***A24F 40/46*** | (2020.01) |
| ***A24F 40/60*** | (2020.01) |
| ***H05B 3/24*** | (2006.01) |

(56) References Cited

U.S. PATENT DOCUMENTS

| | | | | |
|---|---|---|---|---|
| 10,321,713 | B2 | 6/2019 | Hopps | |
| 10,362,809 | B2 | 7/2019 | Worm | |
| 2005/0133029 | A1 | 6/2005 | Nicols | |
| 2011/0126848 | A1* | 6/2011 | Zuber | A24F 40/46 131/329 |
| 2014/0000638 | A1* | 1/2014 | Sebastian | A24F 40/50 131/328 |
| 2014/0338680 | A1* | 11/2014 | Abramov | A24F 40/20 131/328 |
| 2014/0345606 | A1 | 11/2014 | Talon | |
| 2016/0050975 | A1 | 2/2016 | Worm | |
| 2017/0035110 | A1 | 2/2017 | Keen | |
| 2021/0022410 | A1* | 1/2021 | Huang | A24F 7/00 |
| 2021/0360978 | A1 | 11/2021 | Grandjean | |

FOREIGN PATENT DOCUMENTS

| | | |
|---|---|---|
| GB | 2534208 | 7/2016 |
| JP | 2014-525237 | 9/2014 |
| JP | 7155409 | 10/2022 |
| KR | 10-2016-0096171 | 8/2016 |
| RU | 2602053 | 11/2016 |
| WO | WO 2013/060743 | 5/2013 |
| WO | WO 2015/148649 | 10/2015 |
| WO | WO 2016/150922 | 9/2016 |

OTHER PUBLICATIONS

Office Action issued in Korea for Application No. 10-2021-7006761 dated Feb. 24, 2023 (8 pages). English translation included.

Office Action issued in Russia for Application No. 2021109945 dated Sep. 15, 2021 (8 pages). English translation included.

Search Report and Written Opinion for PCT/EP2019/076068 dated Dec. 6, 2019 (12 pages).

International Preliminary Examination Report on Patentability for PCT/EP2019/076068 dated Aug. 4, 2020 (6 pages).

Office Action issued in China for Application No. 201980058456.4 dated Aug. 31, 2023 (13 pages). English translation included.

Office Action issued in Japan for Application No. P2020-160715 dated Sep. 19, 2023 (7 pages). English translation included.

* cited by examiner

AEROSOL GENERATING SYSTEM WITH SUBSTRATE ADVANCE

This application is a U.S. National Stage Application of International Application No. PCT/EP2019/076068 filed Sep. 26, 2019, which was published in English on Apr. 2, 2020 as International Publication No. WO 202/064944 A1. International Application No. PCT/EP2019/076068 claims priority to European Application No. 18197775.2 filed Sep. 28, 2018.

This disclosure relates to an aerosol generating system; and more particularly, to an aerosol generating system that maintains contact of an aerosol-forming substrate with a heating element.

Traditional electronic aerosol generating devices are heat-not-burn devices that may contain e-liquids that tend to leak out of the aerosol generating device. The e-liquids are typically a low viscosity fluid formed of glycerol, glycol and nicotine.

Design of these electronic aerosol generating devices focuses on reducing system leakage of the e-liquid during transit, storage, and during use. Despite these design efforts, e-liquid leakage is still a problem for these electronic aerosol generating devices. In addition, there are regional regulations that limit the maximum concentration of nicotine to about 2% by weight. This limits the available nicotine to be delivered, thus efficient vaporization of nicotine is required.

It would be desirable to provide an electrically heated aerosol-generating system that utilizes a gel or viscous aerosol-forming substrate that minimizes substrate leakage. It would also be desirable to provide an electrically heated aerosol-generating system that improves nicotine delivery. It would further be desirable to provide an electrically heated aerosol-generating system that maintained contact between the heating element and the aerosol-forming substrate, as the aerosol-forming substrate is being consumed. It would be desirable to provide an electrically heated aerosol-generating system that moves (automatically or manually) the aerosol-forming substrate only in one direction toward the heating element.

Various aspects of the invention relate to an aerosol generating system having a body defining a cavity, an aerosol-forming substrate disposed in the cavity. A heating element is disposed proximate to the cavity. A controller is configured to detect contact of the aerosol-forming substrate with the heating element.

According to an aspect of the present disclosure, the aerosol generating system further comprises a mechanical advancement mechanism configured to advance the aerosol-forming substrate towards the heating element. The mechanical advancement mechanism may comprise a mechanically movable part. The mechanical advancement mechanism may be configured to advance the aerosol-forming substrate towards the heating element in response to a command given by the controller or a user.

According to an aspect of the present disclosure, the controller detects a resistance of the heating element. The controller may indicate that the substrate is not in contact with the heating element and alert a user to manually move or advance the substrate toward the heating element. Alternatively, the controller may automatically advance the substrate toward the heating element upon the indication that the substrate is not in contact with the heating element. Thus, the substrate maintains contact with the heating element even as the substrate is consumed during use. The advancement mechanism may form a portion of the aerosol-generating article (or cartridge). The advancement mechanism may form a portion of the aerosol-generating device that receives the aerosol-generating article (or cartridge).

According to an aspect of the present disclosure, the substrate may only move or be advanced toward the heating element. Detent or stop elements may be arranged to prevent movement of the substrate away from the heating element. The substrate may move or be advanced toward the heating element by an advancement mechanism. The advancement mechanism may form a portion of the aerosol-generating article (or cartridge) or the advancement mechanism may form a portion of the aerosol-generating device that receives the aerosol-generating article (or cartridge). The substrate may move or be advanced toward the heating element via a helical, spiral or screw grove or thread where rotational movement is translated into lateral movement toward the heating element. In these aspects, the rotational movement may be limited to a single rotational direction. The substrate may move or be advanced toward the heating element via a pushing rod providing direct lateral movement to the substrate. A stop element may be configured to allow rotation or lateral movement of the substrate only toward the heating element. The stop element may comprise a ratchet.

In some embodiments, the substrate (also referred herein as "aerosol-forming substrate") may comprise a gel or viscous liquid that volatizes when heated by the heating element. The vaporized compounds of the substrate contribute to the formation of the aerosol. The substrate may comprise nicotine at about 2% by wt, or at about 1% to about 2% by wt.

In some embodiments, the heating element may be a grid or mesh element or layer. The gel or viscous liquid may flow into the interstitial spaces forming the grid or mesh element. The controller may detect the resistance of the heating element and indicate that the substrate is, or is not, in contact with the heating element, based on, for example, a resistance threshold value of the heating element. The heating element may form a portion of the replaceable aerosol-generating article (or cartridge). The heating element may form a portion of the aerosol-generating device receiving the replaceable aerosol-generating article (or cartridge).

In some embodiments, a visual indicator may be configured to activate when the controller detects a resistance threshold value of the heating element. A user may then manually advance the substrate. Alternatively, an actuator is configured to move or advance the substrate toward the heating element when the controller detects a resistance threshold value of the heating element. The controller may include a power source. The controller may include or be operably connected to a graphical user interface or indicator light.

In some embodiments, the body forms a cartridge that is received in an aerosol-generating device and the advancement element forms a portion of the cartridge and the heating element forms a portion of the aerosol-generating device.

In some embodiments, the body forms a cartridge that is received in an aerosol-generating device and the advancement element forms a portion of the aerosol-generating device and the heating element forms a portion of the cartridge.

Advantageously, the electrically heated aerosol-generating system maintains or assists in maintaining contact with the gel or viscous liquid substrate and the electrical heater. The advancement mechanism urges the gel or viscous liquid substrate onto the electrical heater so that the gel or viscous liquid substrate onto the electrical heater contacts the electrical heater. In some embodiments, a spring or lip-stick type mechanical advancement feature urges the gel or viscous liquid substrate onto the electrical heater. In other embodiments, a pushing rod or screw element mechanical advancement feature urges the gel or viscous liquid substrate onto the electrical heater. Maintaining contact between the gel or viscous liquid substrate and the electrical heater improves the efficient volatilization of the aerosol-forming substrate. Utilizing the gel or viscous liquid substrate may also reduce or minimize leaking of the gel or viscous liquid substrate from the electrically heated aerosol-generating system.

The term "aerosol" is used here to refer to a suspension of fine solid particles or liquid droplets in a gas, such as air, which may contain nicotine and optional volatile flavour compounds.

An aerosol generating system includes, a body defining a cavity having a cavity opening, an aerosol-forming substrate disposed in the cavity, a heating element disposed proximate to the cavity opening, and a controller configured to detect contact of the aerosol-forming substrate with the heating element.

The aerosol generating system may include an aerosol generating article (that may be referred to as a "cartridge") that mates with an aerosol generating device. The aerosol generating article includes the aerosol-forming substrate. The aerosol generating article is configured to advance the aerosol-forming substrate toward the heating element, preferably the aerosol generating article is configured to advance the aerosol-forming substrate in only one direction, that is, toward the heating element. The heating element may be coupled and form part of the aerosol generating device. Alternatively, the heating element may be coupled and form part of the aerosol generating article.

The aerosol generating article may be provided in any suitable shape, configured to be received by the aerosol-generating device. The aerosol-generating device may be a smoking article, such as a generally rod-shaped smoking article or an article having any other suitable shape. The aerosol-generating article may have a substantially cuboidal shape, cylindrical shape, frustro-conical shape, or any other suitable shape. Preferably, the aerosol-generating article has a generally cylindrical shape, such as an elongated cylindrical shape, or a frustro-conical shape.

The aerosol-generating article may be a cartridge. The cartridge may comprise any suitable body defining a cavity in which the aerosol-forming substrate is disposed. The body is preferably formed from one or more heat resistant materials, such as a heat resistant polymer or metal. The body may comprise a thermally conductive material. For example, the body may comprise any of: aluminum, copper, zinc, nickel, silver, any alloys thereof, and combinations thereof. Preferably, the body comprises aluminum.

The body may comprise a sidewall. The body may define a cavity. According to an embodiment, the sidewall forms a cylinder defining a cavity. The cylinder may comprise a varying diameter, for example a diameter arranged to taper towards one end of the cylinder. Preferably, the cavity has a constant or uniform diameter along the cavity length.

The cylindrical sidewall may have first and second ends. The first end may be closed and second end may be open and define a cavity opening. A rigid base may terminate and close the first end of the cylindrical sidewall and cavity. The rigid base may be movable relative to the cylindrical sidewall. The rigid base may advance toward the cavity opening or second end of the cylindrical sidewall, preferably the rigid base is configured to advance in only one direction, that is, toward the cavity opening or second end of the cylindrical sidewall.

The cavity may be defined by an inner surface of the cylindrical sidewall the rigid base may fit snugly within the inner surface of the cylindrical sidewall and slide along the inner surface of the cylindrical sidewall from the second end to the first end, or cavity opening.

The aerosol-forming substrate is disposed within the cavity. The rigid base is configured to advance the aerosol-forming substrate toward the first end, or cavity opening. The aerosol-generating article or the aerosol-generating device includes a heating element that is proximate the first end, or cavity opening of the aerosol-generating article. The rigid base is configured to advance the aerosol-forming substrate toward the heating element. As the aerosol-forming substrate is heated, vaporized and consumed, the rigid base is configured to automatically or manually be advanced toward the heating element to ensure that the aerosol-forming substrate maintains contact with the heating element.

The aerosol-forming substrate, preferably being a viscous liquid or gel, is advanced toward the heating element, preferably a metal mesh layer for resistive heating, by either a manual mechanism or an automatic mechanism.

Manual advancement may be accomplished by the consumer using a rotating ring external to device and proximate the closed end of the article. The controller of the device may monitor the heating element resistance during each puff. A visual indication (for example, a blinking indicator light) turns on when the heating element resistance increases of about 5%, or about 10%, for example, that may indicate a dry mesh condition (that is, the aerosol-forming substrate no longer contacts the heating element). Such a visual indication may switch off when the consumer turns the article integrated ring a predefined radius to advance the aerosol-forming substrate to advance a predefined distance toward the heating element to maintain contact with the heating element. Alternatively, manual advancement may be accomplished by the consumer activating a switch that energizes an advancement mechanism and advances the substrate toward the heating element to maintain contact with the heating element.

Automatic advancement may be accomplished by the controller activating an actuator on the article. The controller of the device may monitor heating element resistance during puff. When the heating element resistance increases of about 5%, or about 10%, for example, that may indicate a dry mesh condition, (that is, the aerosol-forming substrate no longer contacts the heating element) and a mechanical rotation system is activated. It enables the aerosol-forming substrate to advance a predefined distance toward the heating element to maintain contact with the heating element. Automatic advancement of the advancement mechanism occurs after a puff during which registered mesh resistance is found to be lower than 5-10% than the nominal value.

The advancement mechanism may form a portion of the the aerosol generating device. Alternatively, the advancement mechanism may form part of the aerosol generating article. The advancement mechanism may be configured as a piston-type element. The advancement mechanism may be configured as a screw-type element. The advancement mechanism may translate rotational movement into lateral movement.

The body may comprise one or more parts. For example, the sidewall and an end wall may be an integral single part. The sidewall and the end wall may be two parts configured to engage one another in any suitable manner, such as threaded engagement or interference fit. The sidewall and the end wall may be two parts joined together, for example by welding or by an adhesive. The sidewall and two opposite end walls may be three separate parts configured to engage one another in any suitable manner, such as threaded engagement interference fit, welding, or an adhesive.

The body may comprise a sidewall forming a cylindrical cavity (to contain the aerosol-forming substrate) and a rigid base that fills the diameter of the cavity and is movable along the length of the cavity. The aerosol-forming substrate may contact the rigid base and the rigid base may urge or advance the aerosol-forming substrate along the length of the cavity.

The body may further include a mechanical advancement mechanism that is configured to advance the rigid base and the aerosol-forming substrate along the length of the cavity. The mechanical advancement mechanism may translate rotational movement into longitudinal movement. The mechanical advancement mechanism may apply direct lateral movement to the substrate.

The body may include a ring element that is mechanically coupled to rigid base where rotational movement of the ring element causes lateral or longitudinal movement of the rigid base. For example, the mechanical advancement mechanism may be configured and operate similar to a "lip-stick" advancement mechanism, where pins are coupled to the body and mate with spiral groves on the body and an external tube with a spiral guide. The pins move inside the spiral groves of the body and inside the spiral guide of the external tube.

The body may include a spring element biasing the rigid base to a spring support layer fixed to the second end of the sidewall forming the cylindrical cavity and opposing the cavity opening. The spring element may be present with or without the mechanical advancement mechanism may translate rotational movement into longitudinal movement.

The mechanical advancement mechanism preferably allows lateral or longitudinal movement of the aerosol-forming substrate in only a single direction, namely toward the heating element. The body may include one or more stop or detent elements that prevent lateral movement away from the heating element. The stop elements may be placed along the length of the lateral or longitudinal length of the cavity or body sidewall to advance the aerosol-forming substrate a predetermined distance each time the mechanical advancement mechanism is activated. The stop element may also provide an audible sound that indicates that the aerosol-forming substrate have been advanced the desired set distance.

The stop elements may be placed along the diameter of any rotating or ring element that applies rotational movement to be translated into lateral movement to advance the aerosol-forming substrate a predetermined distance each time the mechanical advancement mechanism is activated. There the stop element prevents rotation of the rotating or ring element in an opposing direction. The stop element may also provide an audible sound that indicates that the aerosol-forming substrate have been advanced the desired set distance. A ratchet element is one example of this type of stop element.

The heating element may comprise a resistive heating component, such as one or more resistive wires or other resistive elements. The resistive wires may be in contact with a thermally conductive material to distribute heat produced over a broader area. Examples of suitable conductive materials include aluminum, copper, zinc, nickel, silver, and combinations thereof.

The heating element may a grid or mesh layer of intersecting resistive elements or wires. The heating element mesh layer may define a plurality of interstitial or mesh openings where the aerosol-forming substrate may fill or flow into during operation of the aerosol-forming system. The aerosol-forming substrate may completely surround the heating element mesh layer during operation. The interstitial or mesh openings may be defined by a width between interstices and the width may be in a range from about 10 to about 100 micrometres. The width or diameter of the intersecting resistive elements or wires may be in a range from about 10 to about 50 micrometres, or from about 15 to about 40 micrometres.

The aerosol-forming substrate may occupy any suitable volume of the cavity. The volume of the aerosol-forming substrate in the cavity may be varied by altering the amount, composition, shape, packing density or format of the aerosol-forming substrate placed in the cavity.

Any suitable aerosol-forming substrate may be provided in the cavity defined by the body of the article. The aerosol-forming substrate is preferably a substrate capable of releasing volatile compounds that may form an aerosol. The volatile compounds may be released by heating the aerosol-forming substrate. The aerosol-forming substrate may be solid or liquid or comprise both solid and liquid components. Preferably, the aerosol-forming substrate comprises a gel or viscous liquid.

The aerosol-forming substrate may comprise nicotine. The aerosol-forming substrate may comprise plant-based material. The aerosol-forming substrate may comprise tobacco, and the tobacco containing material contains volatile tobacco flavor compounds, which are released from the aerosol-forming substrate upon heating. The aerosol-forming substrate may comprise about 1% to about 5% wt-% nicotine, or include about 1 to about 3 wt-% nicotine, or about 1.5 to about 2.5 wt-%, or about 2 wt-% nicotine. The nicotine component may be the most volatile component of the aerosol-forming substrate.

The aerosol-forming substrate may comprise at least one aerosol-former. The aerosol-former may be any suitable known compound or mixture of compounds that, in use, facilitates formation of a dense and stable aerosol and that is substantially resistant to thermal degradation at the operating temperature of the device. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Particularly preferred aerosol formers are polyhydric alcohols or mixtures thereof, such as triethylene glycol, 1,3-butanediol and, most preferred, glycerine. The aerosol-forming substrate may comprise other additives and ingredients, such as flavorants. The aerosol-forming substrate preferably comprises nicotine and at least one aerosol-former. In some embodiments, the aerosol-former is glycerine or a mixture of glycerine and one or more other suitable aerosol-formers, such as those listed above.

The aerosol-forming substrate may comprise any suitable amount of an aerosol-former. For example, the aerosol-former content may be equal to or greater than 5% on a dry weight basis, and preferably between greater than 30% by weight on a dry weight basis. The aerosol-former content may be less than about 95% on a dry weight basis. Preferably, the aerosol-former content is up to about 55%.

In some examples, the aerosol-forming substrate comprises one or more sensory-enhancing agents. Suitable sensory-enhancing agents include flavourants and sensation agents, such as cooling agents. Suitable flavourants include natural or synthetic menthol, peppermint, spearmint, coffee, tea, spices (such as cinnamon, clove and/or ginger), cocoa, vanilla, fruit flavors, chocolate, eucalyptus, geranium, eugenol, agave, juniper, anethole, linalool, and any combination thereof.

In some examples, the aerosol-forming substrate is in the form of a gel (where the gel does not flow without applying a force to the gel). In some examples the aerosol-forming substrate is in the form of a viscous liquid having a viscosity in a range from about $10^3$ to about $10^5$ Pa-s for a shear rate of 0.01 $s^{-1}$.

The heating element (whether forming a portion of the cartridge or device) may be operably coupled to a power supply and a controller to power the heating element and to detect contact between the heating element and the aerosol-forming substrate. The aerosol generating device may comprise control electronics operably coupled to the heating element to control heating of the heating element and thus control the temperature at which the aerosol-forming substrate is heated. The control electronics may be provided in any suitable form and may, for example, include a controller or a memory and a controller. The controller may include one or more of an Application Specific Integrated Circuit (ASIC) state machine, a digital signal processor, a gate array, a microprocessor, or equivalent discrete or integrated logic circuitry. Control electronics may include memory that contains instructions that cause one or more components of the circuitry to carry out a function or aspect of the control electronics. Functions attributable to control electronics in this disclosure may be embodied as one or more of software, firmware, and hardware.

The electronic circuitry may comprise a microprocessor, which may be a programmable microprocessor. The electronic circuitry may be configured to regulate a supply of power. The power may be supplied to the heater element in the form of pulses of electrical current.

In some examples, the control electronics may be configured to monitor the electrical resistance of the heating element and to control the supply of power to the heating element depending on the electrical resistance of the heating element. In this manner, the control electronics may regulate the temperature of the resistive element.

The heating element may be a resistive heating element configured to heat the aerosol-forming substrate to a temperature in a range from about 150° C. to about 300° C.; more preferably from about 180° C. to about 250° C. or from about 200° C. to about 230° C.

The aerosol generating device (or cartridge) may comprise a temperature sensor, such as a thermocouple, operably coupled to the control electronics to control the temperature of the heating element. The temperature sensor may be positioned in any suitable location. For example, the temperature sensor may be configured to insert into the article when received within the device receptacle to monitor the temperature of the aerosol-forming substrate being heated. In addition or alternatively, the temperature sensor may be in contact with the heating element. The sensor may transmit signals regarding the sensed temperature to the control electronics, which may adjust heating of the heating elements to achieve a suitable temperature at the sensor.

The controller may be configured to detect contact of the aerosol-forming substrate with the heating element. The controller may be configured to provide a visual indication that the aerosol-forming substrate becomes spaced apart from the heating element. For example, the controller may sample the resistance across the heating element and once the resistance increases to a threshold value the controller may alert the user that the aerosol-forming substrate is spaced apart from the heating element. The user may manually advance the aerosol-forming substrate toward the heating element. Alternatively, the controller may activate an actuator that automatically advance the aerosol-forming substrate toward the heating element. In some cases the controller may alert the user that the aerosol-forming substrate is spaced apart from the heating element and then automatically advance the aerosol-forming substrate toward the heating element. Once the aerosol-forming substrate is depleted, the controller may alert the user that the aerosol-forming substrate is depleted.

The controller may alert the user via visual indicator or as a message on a graphical user interface. The visual indicator may be a light that or blinking light on or in the body or housing of the aerosol-forming system. The graphical user interface may be on or in the body or housing of the aerosol-forming system.

The control electronics may be operably coupled to a power supply. The aerosol generating device may comprise any suitable power supply. For example, a power supply of an aerosol generating device may be a battery or set of batteries. The batteries of the power supply may be rechargeable, removable and replaceable, or rechargeable and removable and replaceable. Any suitable battery may be used. For example, heavy duty type or standard batteries existing in the market, such as used for industrial heavy-duty electrical power-tools. Alternatively, the power supply may be any type of electric power supply including a super-capacitor or hybrid-capacitor. Alternatively, the assembly can be connected to an external electrical power source, and electrically and electronically designed for such purpose. Regardless of the type of power supply employed, the power supply preferably provides sufficient energy for the normal functioning of the assembly for at least one use until the aerosol-forming substrate in the cartridge is depleted before being recharged or needing to connect to an external electrical power source. Preferably, the power supply provides sufficient energy for the normal functioning of the assembly for at least about 70 minutes of continuous operation of the device, before being recharged or needing to connect to an external electrical power source.

In use, when the aerosol-generating article is received in the receptacle of the aerosol-generating device, heat from the heating element of the device may be transferred into the aerosol generating substrate. When a user draws on the mouthpiece of the aerosol-generating device, air may be drawn into the receptacle of the device, through one or more air passageways in the body of the device, and through the aerosol-generating article. As air passes through the heated aerosol-generating article, volatile compounds in the aerosol generating substrate may release a vapor that is entrained in the air. After the aerosol-forming substrate heats to a sufficiently high temperature, the aerosol-forming substrate also releases vapor into the air flowing through the aerosol-generating article. In some embodiments, the aerosol-forming substrate may require heating to a relatively higher temperature than the aerosol former (for example, to a temperature above the vaporization temperature of volatile compounds of the aerosol-forming substrate). In some embodiments, the air is first heated by a heating element. The volatile compounds in the aerosol former and aerosol-forming substrate are heated by the heated air and optionally also by the heating element to release the vapor. The vapor may cool as it is drawn through the article towards the mouthpiece and form an aerosol. The aerosol may then be delivered to the user at the mouthpiece for inhalation.

The aerosol generating article may include a spring element biasing the rigid base and a spring support fixed to the body. The spring element may advance the rigid base and associated aerosol generating substrate toward the heating element.

The aerosol generating article may include a "lip-stick" mechanism where rotating a ring on the aerosol generating article advances the rigid base and associated aerosol generating substrate toward the heating element. The rigid base may mate with a spiral element disposed on or in an inner surface defining the cavity and rotational movement of the rigid base moves the rigid base toward the heating element.

The aerosol generating article may include a pushing rod that advances the rigid base toward the heating element. Alternatively, the aerosol generating article device may include a pushing rod that advances the rigid base (of the cartridge) toward the heating element.

The aerosol generating article may include a stop element configured to allow rotation in only one direction or lateral movement of the substrate only toward the heating element. The stop element may be integral with or fixed to the rigid base or body. The stop element may comprise a ratchet that prevents movement in an opposing direction. The stop element may also provide an audible indication of advancement of the aerosol generating substrate toward the heating element.

Reference will now be made to the drawings, which depict one or more aspects described in this disclosure. However, it will be understood that other aspects not depicted in the drawings fall within the scope and spirit of this disclosure. Like numbers used in the figures refer to like components. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components. The figures are presented for purposes of illustration and not limitation. Schematic drawings presented in the figures are not necessarily to scale.

Figure 1:
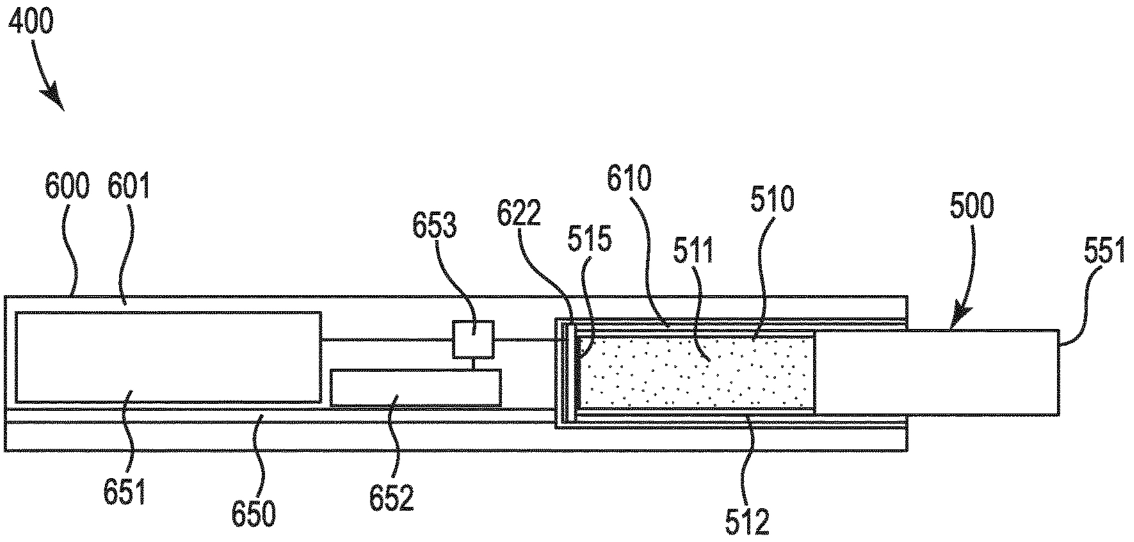
FIG. 1 is a schematic cross-sectional side view of an aerosol-generating system including an aerosol-generating device with the aerosol-generating article of inserted therein.
Figure 7:
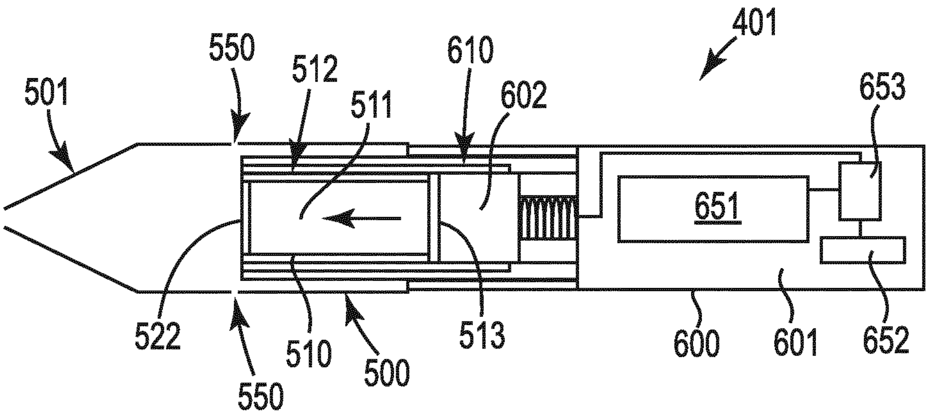

FIG. 7 is a schematic cross-sectional side view of another aerosol-generating system including an aerosol-generating device with the aerosol-generating article of inserted therein Referring now to FIG. 1, an aerosol-generating article 500 may be inserted into an aerosol-generating device 600. The aerosol-generating article 500 and the aerosol-generating device 600 together may form an aerosol-generating system 400.

An aerosol generating system 400 includes a body 512 defining a cavity 510, an aerosol-forming substrate 511 is disposed in the cavity 510 opening 515. A heating element 622 is disposed proximate to the cavity opening 515. A controller 653 is configured to detect contact of the aerosol-forming substrate 511 with the heating element 622.

The aerosol-generating device 600 shown in FIG. 1 is configured for receiving the aerosol-generating article 500. The aerosol-generating device 600 comprises a housing 601 and a receptacle 610 formed in the housing 601. The receptacle 610 is constructed for receiving the aerosol-generating article 500. The receptacle 610 may be sized and shaped so that when the aerosol-generating article 500 is inserted in the receptacle 610, at least a portion (for example the rotation portion or fixed support 551) of the aerosol-generating article 500 remains outside of the receptacle 610.

The aerosol-generating device 600 comprises a heating element 622 at the closed end of the receptacle 610. The cavity opening of the aerosol-generating article 500 abuts the heating element 622 when the aerosol-generating article 500 is received into the receptacle 610. The aerosol-forming substrate 511 preferably is a viscous liquid or gel that may flow into and through the mesh layer of the heating element 622.

Air may flow into the receptacle 610 and entrain the volatized aerosol components from the heated aerosol-forming substrate 511 and through the aerosol-generating device 600 via an air channel 650 and to the consumer.

The aerosol-generating device 600 may include a power supply 651 operably connected to a controller 653 and optional graphical user interface 652. The power supply 651 operably connected to a controller 653 may be disposed within the housing 601. The graphical user interface 652 may be disposed on the housing 601.

The aerosol-generating article 500 includes a body 512 defining a cavity 512 having a cavity opening 516. The aerosol-forming substrate 511 is disposed in the cavity 510. The heating element 622 is disposed proximate to the cavity opening 515. The body 512 includes a closed end portion 551 that may be a ring or rotation portion or a fixed support.

Alternatively, the aerosol-generating article 500 may include an advancement mechanism may be arranged in the proximal end of the aerosol-generating article 500. The advancement mechanism may be configured as a piston-type element. The advancement mechanism may be configured as a screw-type element. The advancement mechanism may translate rotational movement into lateral movement.

Figure 2:
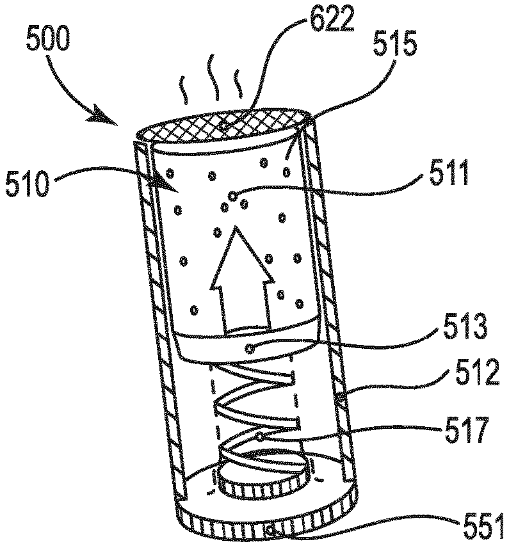
FIG. 2 is a schematic sectional view of a spring-loaded aerosol-generating article.

FIG. 2 is a schematic sectional view of a spring-loaded aerosol-generating article 500. The aerosol-generating article 500 includes a body 512 defining a cavity 510 having a cavity opening 516. The aerosol-forming substrate 511 is disposed in the cavity 512. The heating element 622 is disposed proximate to the cavity opening 515. The body 512 includes a closed end portion 551 that may be a fixed support. A spring element 517 biases a movable rigid base 513 to the spring support 551 fixed to the body 512.

Figure 3:
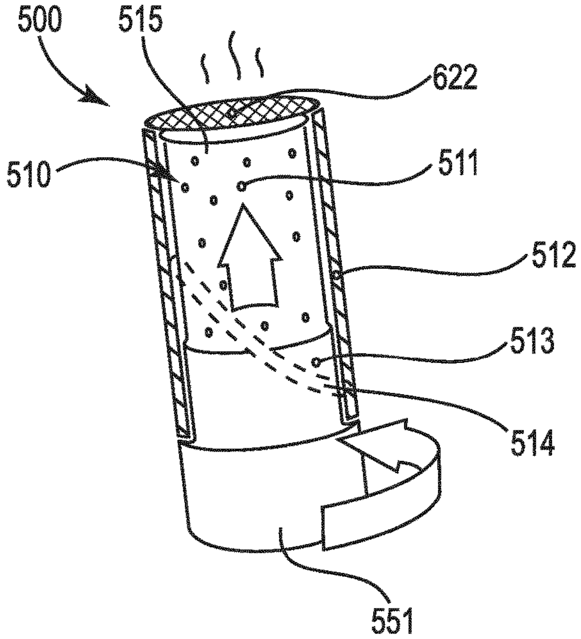
FIG. 3 is a schematic sectional view of a "lip-stick" advance mechanism aerosol-generating article.

FIG. 3 is a schematic sectional view of a "lip-stick" advance mechanism aerosol-generating article 500. The aerosol-generating article 500 includes a body 512 defining a cavity 510 having a cavity opening 516. The aerosol-forming substrate 511 is disposed in the cavity 512. The heating element 622 is disposed proximate to the cavity opening 515. The body 512 includes a ring or rotation element 551 that is coupled to the movable rigid base 513 and translates rotational movement into lateral movement via a spiral or helical groove 514. Pins (not shown) couple the rigid base 513 to the spiral or helical groove 514 to provide the lateral movement of the aerosol-forming substrate 511.

Figure 4:
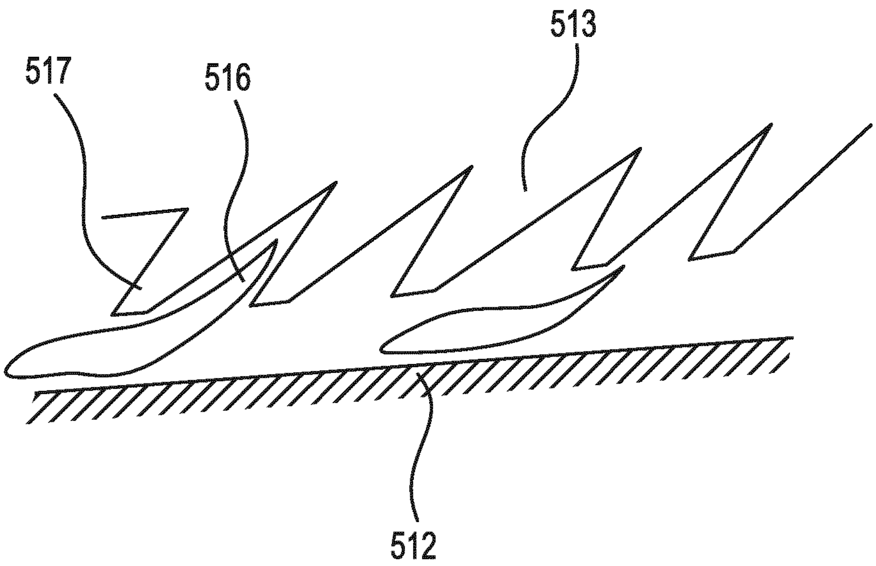
FIG. 4 is a schematic sectional view of a stop elements between the body and the rigid base.

FIG. 4 is a schematic sectional view of a stop elements 516 between the body 512 and the rigid base 513. The stop elements 516 prevent lateral movement of the rigid base 513 and the aerosol-forming substrate 511 in a direction away from the heating element 622. The stop elements 516 may be flexible and the rigid base 513 may include a plurality of projections 517 or threading that mates with the stop elements 516.

Figure 5:
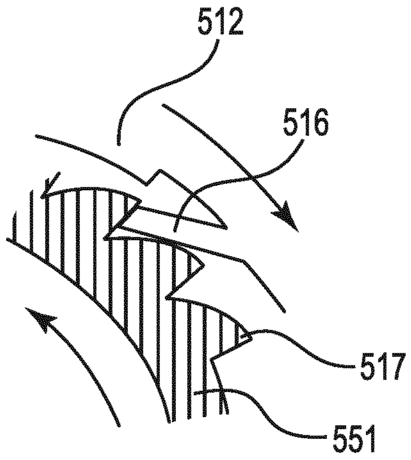
FIG. 5 is schematic sectional view of a ratchet-type stop element.

FIG. 5 is schematic sectional view of a ratchet-type stop element 516 on the body 512. The ring or rotation portion 551 may include a include a plurality of projections 517 or detent elements 517 that mates with the stop elements 516 to provide rotation in only one direction as indicated by the arrow.

Figure 6:
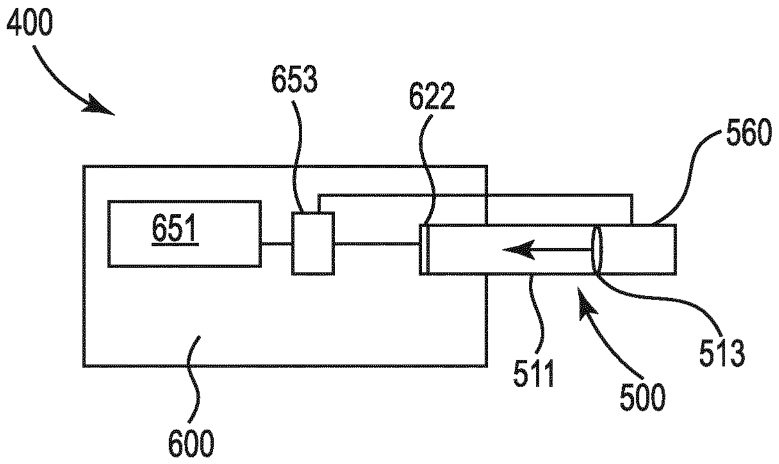
FIG. 6 is a schematic diagram of an illustrative aerosol-generating system with automatic advance of the aerosol-forming substrate.

FIG. 6 is a schematic diagram of an illustrative aerosol-generating system 400 with automatic advance of the aerosol-forming substrate 511. The aerosol-generating device 600 controller 653 may activate an actuator or advancement mechanism 560 on the aerosol-generating article 500 (or on the aerosol-forming device) to advance the aerosol-forming substrate 511 (and rigid base 513) toward the heating element 622 upon detecting that the heating element 622 is not in contact the aerosol-forming substrate 511 (a's described above).

FIG. 7 is a schematic cross-sectional side view of another aerosol-generating system 401 including an aerosol-generating device 600 with the aerosol-generating article 500 of inserted therein.

An aerosol-generating article 500 may be inserted into an aerosol-generating device 600. The aerosol-generating article 500 and the aerosol-generating device 600 together may form an aerosol-generating system 401.

The aerosol-generating article 500 includes a mouthpiece 501 at a proximal portion of the aerosol-generating article 500 and one or more air intakes 550 along the body 512 of the aerosol-generating article 500. In this embodiment, a heating element 522 may form a portion of the heating element 522 and be in electrical connection with the aerosol-generating device 600 when the aerosol-generating article 500 is inserted into the aerosol-generating device 600. The aerosol-generating device 600 may include a pushing rod 602 that advances the aerosol-forming substrate 511 toward the heating element 522. The pushing rod 602 may contact and advance a rigid base 513 of the aerosol-generating article 500. The rigid base 513 may be slidable along the length of the cavity of the aerosol-generating article 500 containing the aerosol-forming substrate 511.

An aerosol generating system 401 includes a body 512 defining a cavity, an aerosol-forming substrate 511 is disposed in the cavity having a cavity 510 opening. A heating element 522 is disposed proximate to the cavity opening and forming a portion of the aerosol-generating article 500. A controller 653 is configured to detect contact of the aerosol-forming substrate 511 with the heating element 522.

The aerosol-generating device 600 shown in FIG. 7 is configured for receiving the aerosol-generating article 500. The aerosol-generating device 600 comprises a housing 601 and a receptacle 610 formed in the housing 601. The receptacle 610 is constructed for receiving the aerosol-generating article 500. The receptacle 610 may be sized and shaped so that when the aerosol-generating article 500 is inserted in the receptacle 610, at least a portion (for example the mouthpiece 501) of the aerosol-generating article 500 remains outside of the receptacle 610.

In this embodiment, the aerosol-generating article 500 comprises a heating element 522 at the open end of the body 512 containing the aerosol-forming substrate 511. The aerosol-forming substrate 511 preferably is a viscous liquid or gel that may flow into and through the mesh layer of the heating element 522.

Air may flow into the aerosol-generating article 500 through the air inlets 550 and entrain the volatized aerosol components from the heated aerosol-forming substrate 511 and through the mouthpiece 501 and to the consumer.

The aerosol-generating device 600 may include a power supply 651 operably connected to a controller 653 and optional graphical user interface 652. The power supply 651 operably connected to a controller 653 may be disposed within the housing 601. The graphical user interface 652 may be disposed on the housing 601.

The pushing rod 602 of the aerosol-generating device 600 may be operably connected to the power supply 651 and controller 653. The controller 653 may actuate the pushing rod 602 to advance the rigid base 513 and aerosol-forming substrate 511 toward the heating element 522.

The specific embodiments described above are intended to illustrate the invention. However, other embodiments may be made without departing from the scope of the invention as defined in the claims, and it is to be understood that the specific embodiments described above are not intended to be limiting.

As used herein, the singular forms "a," "an," and "the" encompass embodiments having plural referents, unless the content clearly dictates otherwise.

As used herein, "or" is generally employed in its sense including "and/or" unless the content clearly dictates otherwise. The term "and/or" means one or all the listed elements or a combination of any two or more of the listed elements.

As used herein, "have," "having," "include," "including," "comprise," "comprising" or the like are used in their open-ended sense, and generally mean "including, but not limited to". It will be understood that "consisting essentially of," "consisting of," and the like are subsumed in "comprising," and the like.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Any direction referred to herein, such as "top," "bottom," "left," "right," "upper," "lower," and other directions or orientations are described herein for clarity and brevity are not intended to be limiting of an actual device or system. Devices and systems described herein may be used in a number of directions and orientations.

Thus, aerosol-generating articles for aerosol-generating devices are described. Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the mechanical arts, chemical arts, and aerosol generating article manufacturing or related fields are intended to be within the scope of the following claims.

The invention claimed is:

1. An aerosol generating system comprising:

a body defining a cavity having a cavity opening;

an aerosol-forming substrate disposed in the cavity;

a heating element disposed proximate to the cavity opening;

a controller configured to detect contact of the aerosol-forming substrate with the heating element; and a mechanical advancement mechanism configured to advance the aerosol-forming substrate towards the heating element.

2. The aerosol generating system according to claim 1, wherein the controller detects a resistance of the heating element.

3. The aerosol generating system according to claim 1, wherein the aerosol-forming substrate is a gel or viscous liquid that volatizes when heated by the heating element.

4. The aerosol generating system according to claim 1, wherein the heating element is a mesh layer disposed across the cavity.

5. The aerosol generating system according to claim 1, further comprising a rigid base disposed within the cavity and being movable only in one direction toward the heating element.

6. The aerosol generating system according to claim 5, further comprising an advancement mechanism configured to advance or move the rigid base toward the heating element.

7. The aerosol generating system according to claim 6, wherein the advancement element comprises a spiral element disposed on the body and rotational movement of a portion of the body moves the rigid base toward the heating element.

8. The aerosol generating system according to claim 7, wherein the rigid base or body comprises a stop element configured to allow rotation of the rotational portion of the body in only one direction.

9. The aerosol generating system according to claim 6, wherein the body forms a cartridge that is received in an aerosol-generating device and the advancement element forms a portion of the cartridge and the heating element forms a portion of the aerosol-generating device.

10. The aerosol generating system according to claim 6, wherein the body forms a cartridge that is received in an aerosol-generating device and the advancement element forms a portion of the aerosol-generating device and the heating element forms a portion of the cartridge.

11. The aerosol generating system according to claim 1, further comprising a visual indicator configured to activate when the controller detects a resistance threshold value of the heating element, and the visual indicator comprises an indicator light or a graphical user interface or both an indicator light and a graphical user interface.

12. The aerosol generating system according to claim 1, further comprising an actuator configured to move the aerosol-forming substrate toward the heating element when the controller detects a resistance threshold value of the heating element.

13. The aerosol generating system according to claim 1, wherein the aerosol-forming substrates comprises nicotine.

14. The aerosol generating system according to claim 1, further comprising a power source operably coupled to the controller.

* * * * *